(12) United States Patent
Huber (10) Patent No.: US 11,300,787 B2
(45) Date of Patent: Apr. 12, 2022

(54) VISUAL FIELD DISPLAY DEVICE FOR A MOTOR VEHICLE

(71) Applicant: Bayerische Motoren Werke Aktiengesellschaft, Munich (DE)

(72) Inventor: Wolfgang-Andreas Huber, Fuerstenfeldbruck (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/049,485

(22) PCT Filed: Jun. 17, 2019

(86) PCT No.: PCT/EP2019/065868
§ 371 (c)(1),
(2) Date: Oct. 21, 2020

(87) PCT Pub. No.: WO2019/243250
PCT Pub. Date: Dec. 26, 2019

(65) Prior Publication Data
US 2021/0263311 A1    Aug. 26, 2021

(30) Foreign Application Priority Data

Jun. 20, 2018   (DE) .................... 10 2018 209 934.0

(51) Int. Cl.
| | | |
|---|---|---|
| G02B 27/01 | (2006.01) | |
| B60K 35/00 | (2006.01) | |
| G02B 27/00 | (2006.01) | |

(52) U.S. Cl.
CPC .......... *G02B 27/0101* (2013.01); *B60K 35/00* (2013.01); *G02B 27/0093* (2013.01);
(Continued)

(58) Field of Classification Search
CPC ... G02B 27/01–0189; G02B 2027/0105–0198; B60K 2370/00–98
See application file for complete search history.

(56) References Cited

U.S. PATENT DOCUMENTS

| | | |
|---|---|---|
| 4,099,841 A | 7/1978 | Ellis |
| 2010/0002453 A1 | 1/2010 | Lusk |

(Continued)

FOREIGN PATENT DOCUMENTS

| | | | |
|---|---|---|---|
| DE | 10 2009 045 169 A1 | 3/2011 | |
| DE | 10 2009 054 232 A1 | 5/2011 | |

(Continued)

OTHER PUBLICATIONS

International Search Report (PCT/ISA/210) issued in PCT Application No. PCT/EP2019/065868 dated Sep. 30, 2019 with English translation (five (5) pages).

(Continued)

*Primary Examiner* — Michelle M Iacoletti
*Assistant Examiner* — Christopher A Lamb, II
(74) *Attorney, Agent, or Firm* — Crowell & Moring LLP (57) ABSTRACT

A visual field display device for a motor vehicle includes an electrically controllable, planar pixel arrangement, particularly at least one flat screen monitor, for producing a projection light beam having a display content, a reflection-suppressing deflection arrangement arranged on the planar pixel arrangement, including one or more flat reflection surfaces, extending along the planar pixel arrangement at a predetermined, acute angle thereto and parallel to one another, for projecting the generated projection light beam onto a partially transparent, reflective projection pane, particularly a windshield of the motor vehicle. As a result, a virtual display image, shown in a visual field of a user, is generated behind it. The one or the plurality of reflection (Continued)

surfaces are designed on the rear sides thereof in a light-absorbing manner in order to suppress interfering reflections.

11 Claims, 6 Drawing Sheets

(52) U.S. Cl.
CPC .................. *B60K 2370/1529* (2019.05); *B60K 2370/166* (2019.05); *B60K 2370/167* (2019.05); *B60K 2370/168* (2019.05); *B60K 2370/169* (2019.05); *B60K 2370/179* (2019.05); *B60K 2370/741* (2019.05); *G02B 2027/0118* (2013.01); *G02B 2027/0134* (2013.01); *G02B 2027/0141* (2013.01)

(56) References Cited

U.S. PATENT DOCUMENTS

| | | | | |
|---|---|---|---|---|
| 2011/0051029 | A1* | 3/2011 | Okumura | G03B 21/28 349/57 |
| 2013/0010366 | A1* | 1/2013 | Nakamura | B60K 35/00 359/633 |
| 2015/0331487 | A1* | 11/2015 | Roth | H04W 4/40 345/156 |
| 2016/0299340 | A1 | 10/2016 | Wang | |
| 2018/0004043 | A1 | 1/2018 | Choi et al. | |

FOREIGN PATENT DOCUMENTS

| | | |
|---|---|---|
| DE | 10 2011 108 053 A1 | 1/2013 |
| DE | 10 2015 222 842 A1 | 5/2017 |
| DE | 10 2015 224 939 A1 | 6/2017 |
| JP | 2006-208583 A | 8/2006 |
| WO | WO 2009/157046 A1 | 12/2009 |

OTHER PUBLICATIONS

German-language Written Opinion (PCT/ISA/237) issued in PCT Application No. PCT/EP2019/065868 dated Sep. 30, 2019 (five (5) pages).

German-language Search Report (PCT/ISA/210) issued in German Application No. 10 2018 209 934.0 dated Jan. 30, 2019 with partial English translation (10 pages).

* cited by examiner

Fig. 9c

VISUAL FIELD DISPLAY DEVICE FOR A MOTOR VEHICLE

BACKGROUND AND SUMMARY OF THE INVENTION

The invention relates to visual field display apparatuses, in particular head-up displays for motor vehicles. The present invention in particular relates to measures for suppressing bothersome reflections caused by ambient light that is incident on an image-generating pixel arrangement.

Visual field display apparatuses in a motor vehicle are known in particular under the term head-up displays (HUDs). They are used to superpose a display content, such as information relating to a speed limit, into the visual field of the driver in the form of a virtual display image in front of the motor vehicle so that the driver has no need to take their gaze off the road. For this purpose, a visual field display apparatus typically comprises a projection unit that generates a projection light beam with a desired display content using a display, which is accommodated below a dashboard upper side, and a suitable projection optical unit and projects it for example onto the windshield of the motor vehicle, from where it is reflected toward the driver. The distance of the virtual display image from the windshield is determined by the optical construction of the projection unit.

In the case of this conventional construction, the HUD has a relatively small field of view, which generally extends only just about to the horizon. The limited installation space within the dashboard suppresses an enlargement of the field of view. In particular, the known projection optical unit takes up a lot of space in the vertical direction. The driver in this case looks into a telescope, as it were, and a nearby display image generated on the display in the HUD interior therefore appears to the driver to be located in the distance in front of the motor vehicle. Consequently, only limited solid angles in which the HUD image can be superposed onto the view through the windshield are representable, corresponding to an "opening of the telescope". Contact-analog superpositions, as are known for example from augmented reality, are not possible outside this limited solid angle and the fixedly defined distance of the virtual HUD display image.

On the other hand, for example DE 10 2009 054 232 A1 discloses a head-up display for the stereoscopic display of information in a motor vehicle having image-generating means for generating two different individual images intended for the two eyes of an occupant and a display unit on which light-emitting points are able to be generated, whose light rays are visible to the occupant on account of a reflection on the windshield of the motor vehicle. Furthermore, deflection means, such as a matrix-type arrangement of small lenses, that deflect light rays from different light-emitting points into different emission directions are provided in the beam path between the display unit and the windshield. In addition, image point assignment means for assigning image points of the individual images to light-emitting points of the display unit are provided. The relative arrangement of the components and the assignment mentioned are such that the individual image intended for the left eye is visible to the left eye of the occupant, and the individual image intended for the right eye is visible to the right eye of the occupant. A stereoscopic display of information can be particularly conducive to a contact-analog representation of the contents.

For visual field display apparatuses, additional measures are generally provided that suppress bothersome reflections of ambient light at the components thereof, which could result in the user being dazzled. For this purpose, for example a cover sheet that seals the projection unit with respect to the outside is made geometrically non-reflective (what is known as a glare trap) in a conventional HUD. Anti-reflection techniques known therefrom, however, are not suitable for a display that is arranged directly opposite the windshield.

It is an object of the present invention to provide a visual field display apparatus, in particular for a motor vehicle, that offers extended possibilities for representing information, in particular with respect to a larger field of view and/or contact-analog representation while simultaneously ensuring freedom from bothersome reflections.

This object is achieved by a visual field display apparatus, by a method for operating it, by a corresponding control unit, and by a corresponding motor vehicle, in accordance with the independent claims. Further configurations are stated in the dependent claims. All the developing features and effects stated in the claims and the description for the visual field display apparatus also apply in respect of the operating method therefor, the control unit, or the motor vehicle, and vice versa.

According to a first aspect, a visual field display apparatus, in particular for a motor vehicle, is provided. The visual field display apparatus comprises an electrically controllable area-forming pixel arrangement, in particular at least one flat-panel screen or a two-dimensional pixel matrix of a different type, for generating a projection light beam with a desired display content. The visual field display apparatus furthermore comprises a reflection-suppressing deflection arrangement that is arranged on the area-forming pixel arrangement and comprises one or more planar reflection surface(s), extending parallel to one another along the area-forming pixel arrangement at a predetermined acute angle thereto, for projecting the generated projection light beam onto a partially transparent reflective projection screen, in particular a windshield of the motor vehicle, as a result of which a virtual display image that is superposed into a visual field of a user is generated behind the windshield. The one or the plurality of reflection surface(s) is/are here formed to be light absorbing on the rear side(s) thereof so as to suppress bothersome reflections.

Owing to the plurality of reflection surfaces at an identical acute angle of attack with respect to the area-forming pixel arrangement, the projection light beam generated thereby is projected onto the projection screen, i.e. is deflected for all pixels in the same direction without changing it otherwise. In particular, it is possible, when using nearly 100% reflective reflection surfaces at a suitable distance from one another that is dependent on the size of the reflection surfaces, to ensure a brightness and a form reproduction as in the case of a perpendicular view of the area-forming pixel arrangement. For example, a stereoscopic effect of an autostereoscopic screen is also maintained in this case.

At the same time, complete suppression of bothersome reflections of the ambient light from any directions can be achieved in the case of this geometry of the reflection surfaces on account of the rear sides thereof that are formed to be light-absorbing, wherein as a matter of principle any coating that absorbs sunlight and is known per se is suitable, for example a matt black coat.

The reflection surfaces of the reflection-suppressing deflection arrangement can be located in particular by their lower edges directly on the area-forming pixel arrangement, which can also comprise a protective capping layer and/or further intermediate layers, such as for an autostereoscopic or further functions, if required. The predetermined acute angle of attach can be determined in application-specific terms for example by a relative geometric arrangement of the area-forming pixel arrangement, of the projection screen, and/or of the eyes of a user.

In contrast to the conventional HUD type of construction that was mentioned in the introductory part, which has a projection optical unit accommodated in the interior of the instrument panel of a motor vehicle, a visual field display apparatus of the type presented here has a significantly flatter construction and can for example be installed with only a few cm of installation depth in an upper side of the instrument panel or be mounted thereon retroactively. The system therefore offers the possibility of scaling the usable solid angle (here also referred to as field of view) within the visual field of a user in accordance with the area-forming extent of the pixel arrangement beyond the boundaries of a conventional HUD and in principle of even using an entire upper side of the instrument panel and thus the entire projection region thereof in the windshield of the motor vehicle to superpose virtual display contents for the driver and other occupants. This allows a significant expansion of the field of view of the visual field display apparatus, for example also vertically and clearly beyond the horizon, which is suitable in particular for contact-analog representations for the driver and other occupants to support navigation or during autonomous driving. In particular, the visual field display apparatus of the type presented here makes a real contact-analog 3D effect (stereo augmented reality) possible.

The area-forming pixel arrangement for this purpose can be formed in a known manner for autostereoscopic or 3D representation by virtue of it comprising for example a two-dimensional pixel matrix in the form of a liquid-crystal screen with a microlens array arranged thereon. Such an area-forming pixel arrangement can be controlled by an image-generating unit and/or a suitable control unit such that two different 2D images reach the left and the right eye of a user so as to bring about in the user a spatial impression of the represented virtual display image.

The area-forming pixel arrangement, however, can also be formed at least partially for 2D representation, i.e. without depth impression. The term "area-forming" here quite generally means that the pixel arrangement extends over an area that can be at least partially planar or indeed curved or convex. In particular, the area-forming pixel arrangement can be adapted to a curvature of the upper side of the instrument panel of a motor vehicle, if required, for example by the pixel arrangement being constructed in a stepped or interleaved manner from a plurality of smaller partial areas, such as planar displays.

The plurality of mutually parallel reflection surfaces of the reflection-suppressing deflection arrangement can be designed to be identical to one another or indeed such that they differ from one another in terms of their shapes or sizes. Depending on their shapes and sizes, their distance from one another in a direction that is perpendicular to their direction of extent can be chosen such that an almost complete suppression of bothersome reflections and substantially loss-free deflection of the projection light beam are ensured. A number of examples of this are listed further below. (In the present case, "substantially" means that, due to the production or construction, in particular a deviation of up to approximately 10% from relevant spatial directions, dimensions, or portions is possible.)

In a pixel area that is covered by the reflection-suppressing deflection arrangement, stripes that are visible to the user of the visual field display apparatus as a result of the deflection of the light at the reflection surfaces, with stripes that are not visible to the user being located therebetween, extend parallel to the reflection surfaces. These stripes that are not visible can therefore be left black in the pixel arrangement or be used for other functions, for example as an air outlet for windshield heating or interior ventilation, as an opening for a sound source, as a light source of diffuse interior illumination, or as a region of overlap when interleaving adjacent partial areas of a composed area-forming pixel arrangement or arranging them in the form of steps. The ratio of visible to non-visible stripes depends on a viewing angle of the user relative to the area-forming pixel arrangement, while the width and frequency thereof, in particular the periodicity thereof, are determined by the corresponding dimensions of the reflection surfaces projected onto the area-forming pixel arrangement.

The projection screen during operation of the visual field display apparatus is arranged above the reflection-suppressing deflection arrangement so that it reflects the deflected projection light beam toward the eyes of the user, as a result of which a virtual display image is produced behind the projection screen. The projection screen can, but does not have to, be considered to be a constituent part of the visual field display apparatus. In particular, it can be a windshield of the motor vehicle or be part thereof. Alternatively, the projection screen can also be another pane suitable for generating the virtual display image both in a motor vehicle and also in other applications. When controlling the area-forming pixel arrangement, in particular any curvature of the projection screen can be corrected in a manner known per se by way of a suitable correction algorithm when performing the image generation.

According to an embodiment, at least one of the reflection surfaces of the reflection-suppressing deflection arrangement is formed by a lateral-surface side of a prism arranged on the area-forming pixel arrangement. Such a prism can give the respective reflection surface in particular a high mechanical stability. For example by chamfering or rounding exposed and, with respect to the area-forming pixel arrangement, upper prism edges, a risk of injury for a user at the associated reflection surface edges can also be averted. The chamfered or rounded upper edges of the prisms can be formed in particular to be likewise light absorbing, for example in a similar manner to the rear sides of the reflection surfaces.

The prism can be produced from any material that is transparent for the projection light used, in particular from glass or plastic. If there is an air layer between the reflection surface and its light-absorbing rear side, the reflection can take place by total internal reflection of the projection light beam that has been coupled into the prism at the aforementioned lateral-surface side of the prism, or alternatively a reflective layer, for example made of metal, can be applied thereon and a light-absorbing layer can be applied on the reflective layer.

In particular, the prism can have a triangular cross-sectional area in a plane that is perpendicular to its entire lateral surface, with the result that its other lateral surface side lies on the area-forming pixel arrangement or extends along it, while the third lateral surface side thereof serves as the light exit face for the deflected projection light beam. In particular, a lateral surface side of the prism serving as the light exit face for the projection light beam can be provided from the outside with an anti-reflective coating known per se for suppressing ambient-light reflections.

In this embodiment, in particular a plurality of, most of, or all reflection surfaces of the reflection-suppressing deflection arrangement can in this way be formed by prisms. Lateral surface sides of such prisms that lie on the area-forming pixel arrangement or extend along it can in particular adjoin one another in a direction that is perpendicular to the extent of the reflection surfaces along the area-forming pixel arrangement, which can for example bring about an arrangement that is particularly stable mechanically and covers the underlying area-forming pixel arrangement completely so as to additionally protect it.

Alternatively, however, prism edges that are located opposite the respective reflection surfaces can be cut off in a region corresponding to the aforementioned invisible stripes, for example to use the invisible stripes in the area of the area-forming pixel arrangement for ventilation or other functions and/or to reduce the weight of and the material used by the reflection-suppressing deflection arrangement. For a respective prism, this gives a trapezoid cross section in a plane perpendicular to the entire lateral surface of the prism or, if the upper prism edge is also chamfered, a corresponding pentagonal cross section.

In a specific configuration of the reflection-suppressing deflection arrangement, the front reflection surface thereof located closest to a user is covered by a darkened or light-absorbing cover surface in the viewing direction of the user. This can prevent the user being dazzled by ambient light reflected at this reflection surface. The cover surface in the above embodiment can cover for example a lateral surface side, facing the user, of the respective prism, whose other lateral surface side, facing away from the user, forms the aforementioned front reflection surface. However, the cover surface can also be a separate surface arranged upstream of the front reflection surface in the direction of the user. For example, the same coating as for the light-absorbing rear sides of the reflection surfaces is suitable for the cover surface.

In a specific configuration of the reflection-suppressing deflection arrangement, a light exit plane connecting, for in each case two adjacent reflection surfaces, an upper edge of one reflection surface and the lower edge of the rear side of the next reflection surface is oriented substantially perpendicular to the projection screen during the operation of the visual field display apparatus. This can contribute in particular to a complete suppression of bothersome reflections for ambient light from any directions.

In a specific configuration of the reflection-suppressing deflection arrangement, upper edges of the plurality of mutually parallel reflection surfaces are located substantially on a line, from the view of the user of the visual field display apparatus, during the operation of the visual field display apparatus. The reflection surfaces can thereby be obscured from direct view of the user. This can be settable manually or at least partially in automated fashion, for example by eye tracking, in particular by means of a suitable lift/tilt device for the reflection-suppressing deflection arrangement or the area-forming pixel arrangement depending on a current eye position of the user.

In a specific configuration, the area-forming pixel arrangement comprises at least one autostereoscopic screen and/or at least one 2D screen. Using an autostereoscopic screen, representations perceived in particular as truly three-dimensional can be generated at a variety of distances between approximately 1 m, such as between approximately 1.2 m in typical windshield arrangements in a motor vehicle, up to infinitely far from the eyes of the user by means of the visual field display apparatus of the type presented here. In this case, in particular in principle all different planes of convergence are able to be realized simultaneously, allowing immersion in a virtual 3D world. Using a 2D screen that is provided alternatively or additionally, representations at a fixed distance from the user of for example approximately 1 to 1.5 m, in particular approximately 1.2 m in typical windshield arrangements in a motor vehicle or approximately 10 cm outside in front of the windshield, can be generated.

In a specific configuration, the visual field display apparatus furthermore comprises, in addition to the area-forming pixel arrangement with the reflection-suppressing deflection arrangement that is arranged thereon, a conventional projection unit of the type mentioned in the introductory part for generating a further virtual display image superposed into a visual field of a user. That is to say that the projection unit has, in its interior, an image-generating unit for generating a further projection light beam with a further display content and a conventional projection optical unit, arranged opposite the image-generating unit, for projecting the generated further projection light beam onto a partial surface of the projection screen. The area-forming pixel arrangement with the reflection-suppressing deflection arrangement that is arranged thereon can be arranged for example next to a light exit opening of the projection unit, in particular directly adjoining it and/or around it and/or flush with the rim thereof. As a result, the conventional HUD technology can be combined with that of the type presented here in order to be used simultaneously or in alternation, depending on the situation (referred to as the hybrid approach here).

According to a further aspect, a method for operating a visual field display apparatus in accordance with the above specific configuration with upper edges of the plurality of reflection surfaces oriented substantially on a line in the direction of the eyes of the user is provided. The method comprises the following steps:

providing a current position, in particular an eye position or a viewing direction, of a user of the visual field display apparatus, for example by eye tracking using a camera or in another known manner; and orienting upper edges of the plurality of mutually parallel reflection surfaces of the reflection-suppressing deflection arrangement substantially in a line leading to the eyes of the user depending on the provided current user position, for example by automated actuation of the above-mentioned lift/tilt device.

According to a further aspect, a method for operating a visual field display apparatus in accordance with the above specific configuration, in which the area-forming pixel arrangement has at least one autostereoscopic screen and/or at least one 2D screen, is provided. The method comprises the following steps:

capturing a current environment behind the projection screen, in particular an environment, located ahead, of the motor vehicle; and superposing contact-analog information, in particular virtual object images and/or object markings, into the visual field of a user of the visual field display apparatus via the at least one autostereoscopic screen and/or the at least one 2D screen depending on the captured environment, in particular to support the user in the navigation or for visualizing a driving situation in the case of highly automated or fully automated driving (HAD/FAD).

Methods for precisely capturing the outside world of a traveling motor vehicle and the orientation thereof in the outside world are known per se, and examples of suitable algorithms for calculating a monoscopic or stereoscopic representation of relevant environment objects for vehicle occupants also exist. By superposing contact-analog information using the present visual field display apparatus, in particular by means of an autostereoscopic area-forming pixel matrix, for example the correct lane, exit, entrance etc. can be marked, in particular in color and/or by arrows in each case at a spatially appropriate distance and orientation, to support the driver in the navigation. With corresponding marking of other vehicles or other objects in a HAD/FAD regime, an intention and view of the motor vehicle can for example be visualized for the occupants, for example for creating confidence in the occupants or for an additional check.

Alternatively or in addition, infotainment contents can be superposed for one or more users of the visual field display apparatus, for example for occupants of a parked motor vehicle or, in the case of a HAD/FAD regime, in a suitable partial region of the projection surface via the least one autostereoscopic screen and/or the at least one 2D screen of the area-forming pixel arrangement. A field of view of the present visual field display apparatus that is enlarged as compared to conventional HUDs can be used here for increased comfort for the users and for extended possible uses, for example for a cinema experience in 2D or 3D for one or more occupants of the motor vehicle.

According to a further aspect, a method for operating a visual field display apparatus in accordance with the above specific configuration with an additional projection unit of a conventional type (abovementioned hybrid approach) in a moving superordinate system, in particular a motor vehicle, is provided. The method comprises the following steps: providing system state data, in particular relating to a current operating state of an engine or an on-board energy store, and/or providing distance data for a path section lying ahead, details, in particular in the case of the motor vehicle, relating to a speed limit, relating to an ascending or descending gradient, relating to one or more bends, relating to weather conditions, relating to traffic, and/or relating to vehicles driving ahead; and statically superposing, in particular independently of real objects behind the projection screen, predetermined information into the visual field of a user of the visual field display apparatus via the projection unit and/or the at least one autostereoscopic screen and/or the at least one 2D screen of the area-forming pixel arrangement depending on the provided system state data and distance data.

The predetermined static information can be, for example, warnings in the case of a critical state of charge of an on-board energy store or a critical filling level of an on-board fuel tank or impending bad weather or an indication of a currently applicable speed limit or the exceedance thereof, etc. Providing system state data and distance data required for the specific application can be implemented in particular in a manner known per se, for example using on-board sensors and navigation systems.

According to a further aspect, a control unit for a visual field display apparatus of the type presented here is provided, wherein the control unit is designed for at least partially automated performance of a method in accordance with one of the above aspects.

According to a further aspect, a motor vehicle is provided, comprising the following:

an upper side, extending between a windshield of the motor vehicle and an instrument panel, of the instrument panel; and a visual field display apparatus of the type presented here arranged on or in the upper side of the instrument panel for superposing a virtual display image into a visual field of the driver and/or of further occupants, wherein the area-forming pixel arrangement or the reflection-suppressing deflection arrangement can be arranged in particular substantially flush with the upper side of the instrument panel.

In particular, the motor vehicle can here comprise furthermore a control unit of the type presented here.

BRIEF DESCRIPTION OF THE DRAWINGS

The above aspects of the invention and the embodiments and specific configurations thereof will be explained in more detail below with reference to the examples illustrated in the attached drawings. The drawings are purely schematic; in particular, they should not be interpreted as being to scale. Similar or mutually corresponding elements are provided with the same reference signs in the drawings.

DETAILED DESCRIPTION OF THE DRAWINGS

All the various embodiments, variants, and specific configuration features, mentioned further above in the description and in the following claims, of the visual field display apparatus according to the first aspect of the invention and of the operating methods thereof, of the control unit, and of the motor vehicle according to the further aspects can be implemented in the examples shown in FIGS. 1 to 9c. They will therefore not all be repeated again below. The same is true accordingly for the definition of terms and effects, already specified further above, with respect to individual features that are shown in FIGS. 1 to 9c.

Figure 1:
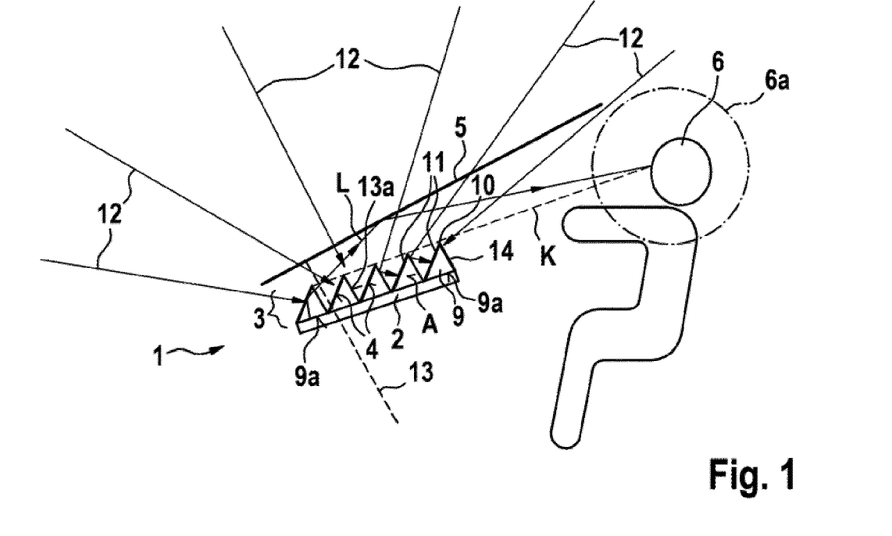
FIG. 1 shows a schematic lateral cross-sectional view of a visual field display apparatus of the type presented here in a motor vehicle.

FIG. 1 shows a highly simplified schematic vertical cross-sectional view of a visual field display apparatus 1 according to the above-mentioned first aspect of the invention in a motor vehicle (not illustrated in FIG. 1, cf. FIGS. 2a-2c and 5a-5b), in particular a head-up display.

The visual field display apparatus 1 comprises an electrically controllable area-forming pixel arrangement 2, in particular in the form of one or more flat-panel screens or a two-dimensional pixel matrix of a different type, which generates a projection light beam L with a desired display content during operation. The visual field display apparatus 1 furthermore comprises a reflection-suppressing deflection arrangement 3 that is arranged on the area-forming pixel arrangement 2 and has in this example a plurality of (purely by way of example five) planar reflection surfaces 4, extending parallel to one another along the area-forming pixel arrangement 2 at a predetermined acute angle thereto. Owing to the deflection of the projection light beam L at the reflection surfaces 4, it is projected onto a windshield 5 of the motor vehicle and reflected thereby to the eyes of a user 6, in particular the driver or front passenger (indicated by way of arrows). As a result, a virtual display image that is superposed into a visual field of the user 6 (cf. FIGS. 5b, 7 and 8) and is superimposed onto a real environment in front of the motor vehicle observed through the windshield 5 for the user 6 is produced behind the windshield 5. The predetermined acute angle of attack of the reflection surfaces 4 can be determined for this purpose in an application-specific manner for example from the relative geometric arrangement of the area-forming pixel arrangement 2, of the windshield 5, and of the user 6. In this case, the reflection surfaces 4 are formed on their rear sides 11 to be light absorbing for suppressing bothersome reflections.

The visual field display apparatus 1 can be mounted for example in or on an upper side 7 of an instrument panel 8 (not illustrated in FIG. 1, cf. FIGS. 2a-2d and 5a) of the motor vehicle between the windshield 5 and the instrument panel 8 or a steering wheel. The area-forming pixel arrangement 2 or the reflection-suppressing deflection arrangement 3 can in this case be arranged at least partially for example substantially flush with the upper side 7 of the instrument panel 8, which can be particularly inconspicuous, protective for the optical components or the user 6, and/or space-saving.

In FIG. 1, purely by way of example, all the reflection surfaces 4 of the reflection-suppressing deflection arrangement 3 are formed by lateral surface sides of prisms 9 made from glass or plastic lying on the area-forming pixel arrangement 2. This can result in a particularly robust construction of the visual field display apparatus 1 and can protect both the area-forming pixel arrangement 2 and the reflection surfaces 4 against damage and also protect the user 6 against injury at exposed edges. In particular, the exposed, upper prism edges 10 can additionally be rounded or chamfered for this purpose.

In particular, the respective prism 9 in FIG. 1 has a triangular cross-sectional area A, with the result that its other, lower lateral surface side 9a lies on the area-forming pixel arrangement 2, while its third lateral surface side serves as the light exit face 13a for the deflected projection light beam L. The light exit faces 13a can be provided in particular from the outside with a suitable anti-reflective coating. In FIG. 1, the lateral surface sides 9a, lying on the area-forming pixel arrangement 2, of the prisms 9 adjoin one another directly purely by way of example.

In the geometric arrangement of the reflection surfaces 4 shown in FIG. 1, nearly complete suppression of bothersome reflections of the ambient light 12 from any directions from the outside and within the motor vehicle can be achieved, as FIG. 1 symbolically indicates by a region 6a around the user 6 that is free from bothersome reflections, owing to the rear sides 11 of the reflection surfaces 4 being embodied to be light-absorbing. For this purpose, for example light exit planes 13 that connect, for in each case two adjacent reflection surfaces 4, an upper edge of one reflection surface and the lower edge of the rear side 11 of the next reflection surface and in which the light exit faces 13a of the prisms 9 are located in this example can be oriented substantially perpendicular to the windshield 5. In particular, the reflection surfaces 4 and their light-absorbing rear sides 11 in this example lie with their lower edges directly on the area-forming pixel arrangement 2, which can also comprise, if necessary, a protective capping layer, etc.

Furthermore, a front reflection surface 4 located closest to the user 6 is covered in FIG. 1 by a darkened or light-absorbing cover surface 14 in the viewing direction of the user 6 for the suppression of bothersome reflections. The cover surface 14 in this example covers a lateral surface side of the front prism 9 facing the user 6. In particular, the same coating is suitable for the cover surface 14, for example a black matt coating, as in the case of the light-absorbing rear sides 11 of the reflection surfaces 4.

Furthermore, upper edges of the reflection surfaces 4 in FIG. 1 lie purely by way of example substantially on a line K from the view of the user 6 of the visual field display apparatus 1. The reflection surfaces 4 can thereby be obscured from direct view of the user 6. This can be settable manually or at least partially in automated fashion, for example by eye tracking, in particular by means of a suitable lift/tilt device for the reflection-suppressing deflection arrangement 3 or the area-forming pixel arrangement 2 depending on a current eye position of the user 6.

Figure 2A:
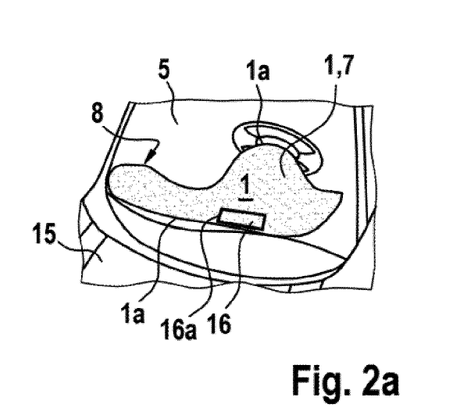
FIG. 2a shows a perspective view of a possible extent of a visual field display apparatus of the type presented here in an upper side of an instrument panel of a motor vehicle.

FIG. 2a schematically shows a perspective view of a possible extent of a visual field display apparatus 1 of the type presented here, for example according to FIG. 1, in an upper side 7 of an instrument panel 8 of a motor vehicle 15. An overall height of the visual field display apparatus 1 in a direction perpendicular to the area-forming pixel arrangement 2 can in particular be only a few centimeters, for example between 0.5 and 10 cm, in particular between 1 and 7 cm, for example approximately 2, 3, 4, 5 or 6 cm. Owing to a correspondingly low installation depth of the visual field display apparatus 1, it can in principle take up an entire surface of the upper side 7 of the instrument panel 8 of the motor vehicle 15 in front of the windshield 5, as is indicated in FIG. 2a by its possible contour 1a. For comparison purposes, FIG. 2a indicates a light exit opening 16 and the rim 16a thereof in the case of a conventional projection unit of an HUD, mentioned in the introductory part, with its projection optical unit (not shown) that is accommodated below the upper side 7 of the instrument panel 8.

Figure 2B:
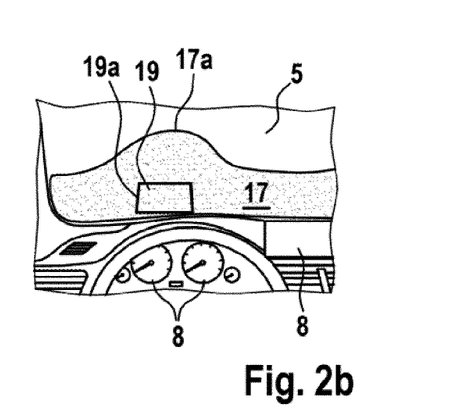
FIGS. 2b and 2d each show a perspective view of a projection region, usable with the visual field display apparatus of FIG. 2a, in the windshield of the motor vehicle from the driver's view.
Figure 2C:
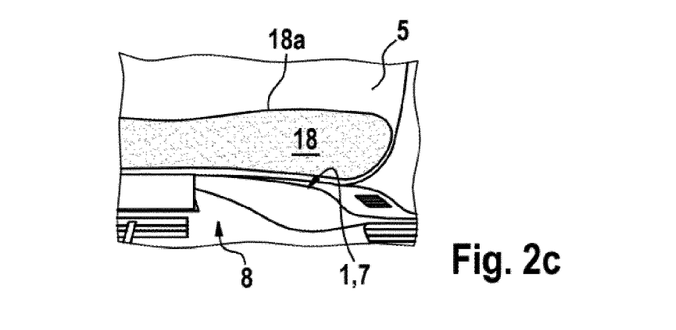
FIG. 2c shows a perspective view of a projection region, usable with the visual field display apparatus of FIG. 2a, in the windshield of the motor vehicle from the view of the front passenger.
Figure 2D:
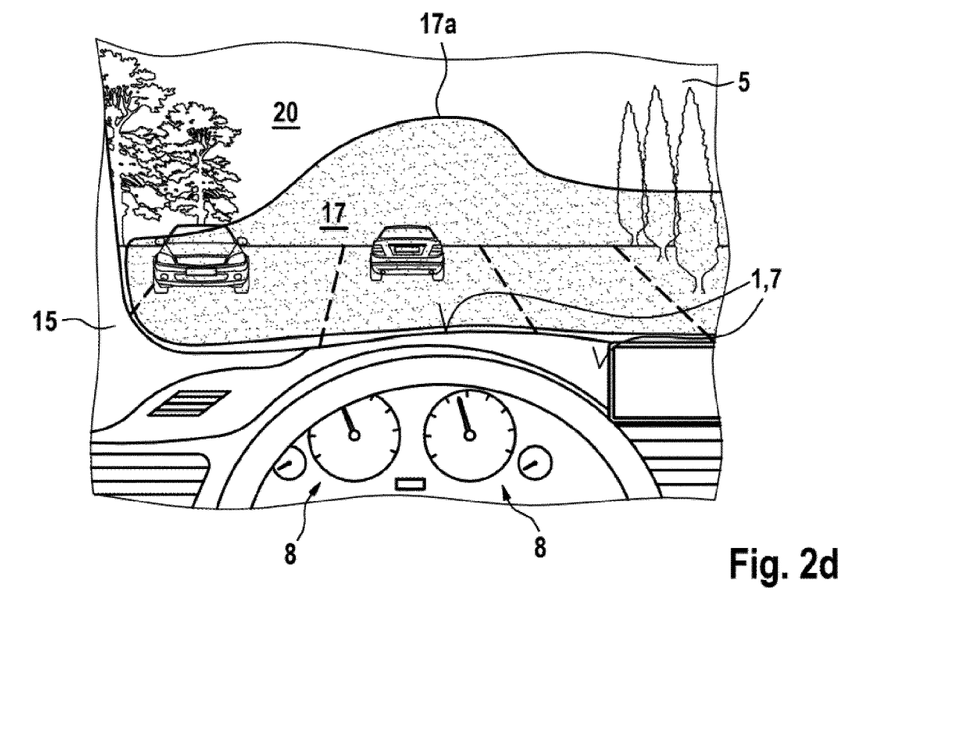

FIGS. 2b and 2d each schematically show a perspective view of a projection region 17, usable with the visual field display apparatus 1 of FIG. 2a, of the windshield 5 of the motor vehicle 15 from the driver's view, the boundary 17a of which corresponds to the contour 1a of the visual field display apparatus 1. Again for comparison purposes, a projection region 19, corresponding to the light exit opening 16 of a conventional projection unit, and its boundary 19a are indicated. By contrast, the projection region 17 that is usable with a visual field display apparatus 1 of the type presented here can extend upwardly noticeably significantly beyond the horizon, and also laterally cover a large portion of the road region in front of the windshield 5 that can be viewed by the driver. Owing to the correspondingly large solid angle or field of view of the visual field display apparatus 1, the latter is particularly highly suitable for contact-analog superposition of virtual support contents into the visual field of the driver depending on the real environment 20 in front of the motor vehicle 15 (augmented reality).

FIG. 2c schematically shows a perspective view of a projection region 18, usable with the visual field display apparatus 1 of FIG. 2a, of the windshield 5 of the motor vehicle 15 from the front passenger's view, the boundary 18a of which corresponds to the contour 1a of the visual field display apparatus 1. As is clearly evident therefrom, the above-mentioned effects of the visual field display apparatus 1 of the type presented here are just as usable for the front passenger. The same is correspondingly true for further occupants of the motor vehicle 15 too, for example from the lounge position in the back. Overall, multi-user use is therefore possible with the visual field display apparatus 1. As long as the contents are to be seen in each case only by one user, the pixel matrix of the area-forming pixel arrangement 2 should be controlled by the evaluation of an eye tracking system for all the users to be taken into account such that the image can be seen only by the relevant user.

Figure 3A:
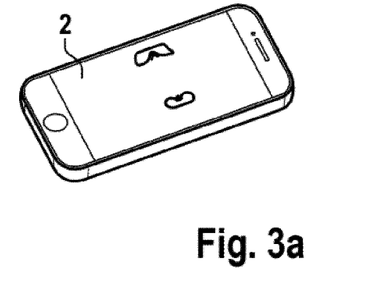
FIGS. 3a to 3c show perspective views of a model example of a visual field display apparatus of the type presented here for illustrating the deflection effect of the reflection-suppressing deflection arrangement thereof with a plurality of prisms.
Figure 3B:
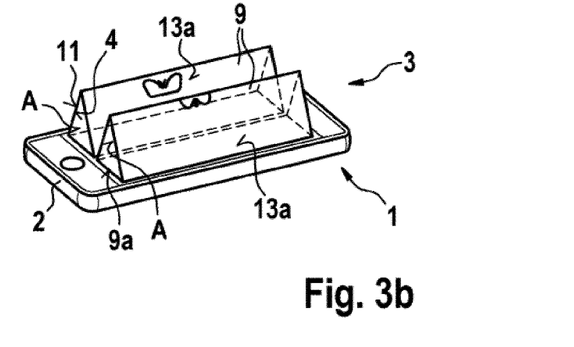
Figure 3C:
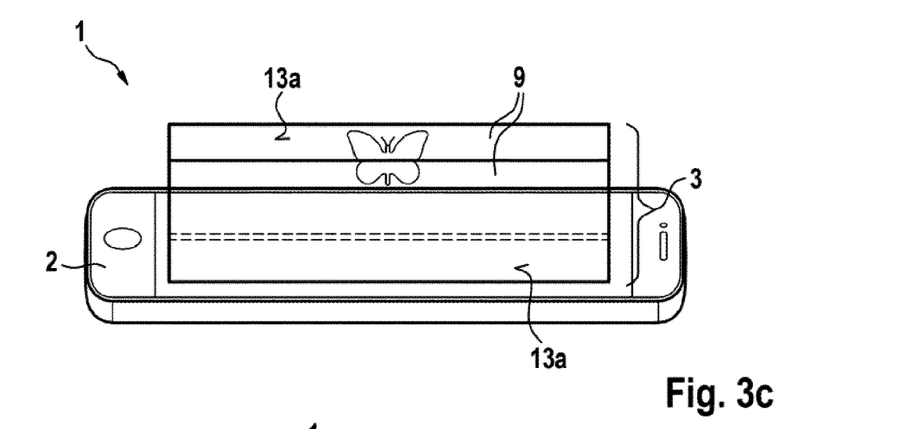

FIGS. 3a to 3c show, in each case in a perspective view, a highly simplified model example for a visual field display apparatus 1 of the type presented here (for example for that of FIG. 1) for illustrating the deflection effect of its reflection-suppressing deflection arrangement 3, the reflection surfaces 4 of which are formed in this model by rear lateral surface sides, facing away from the observer or user, of two prisms 9 with triangular cross-sectional areas A.

The area-forming pixel arrangement 2 in this model example is embodied in the form of a flat-panel screen, which generates a desired display content, in this example the two-dimensional image of a butterfly shown in FIG. 3a, which is transported by the projection light beam L (cf. FIG. 1) coming from the flat-panel screen. As the projection light beam L passes through the reflection-suppressing deflection arrangement 3 arranged on the area-forming pixel arrangement 2, it is deflected at the reflection surfaces 4 of the rear lateral surface sides of the prisms 9 in order to pass, for example as in FIG. 1, onto the windshield 5 of the motor vehicle and, reflected therefrom, to the eyes of the user 6.

As can be seen in FIG. 3b, the projection light beam L coupled in through the lower lateral surface sides 9a of the prisms 9 exits from the light exit faces 13a of said prisms 9, while the rear sides 11 of the reflection surfaces 4 are embodied to be light absorbing with respect to ambient light in order to suppress bothersome reflections.

As is shown in FIG. 3c, the projection light beam L coupled into the reflection-suppressing deflection arrangement 3 leaves the light exit faces 13a of the prisms 9 substantially without any loss in brightness and, in the case of a suitable control of the area-forming pixel arrangement 2 as in FIG. 3a, without loss of shape.

Figure 4A:
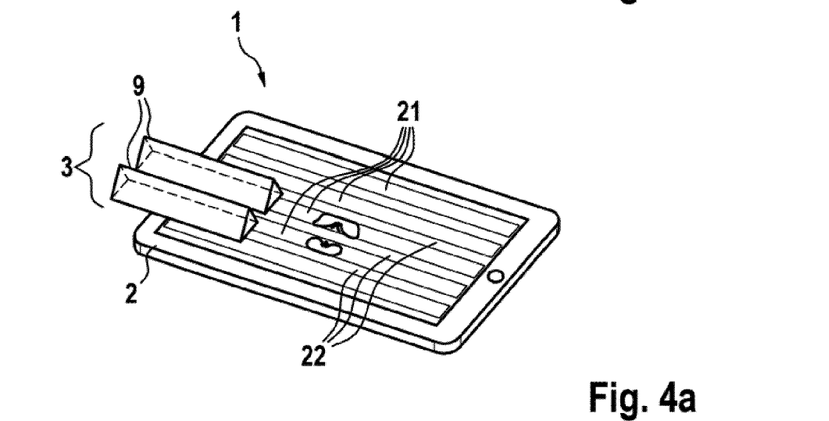
FIGS. 4a and 4b show perspective views of a further model example of a visual field display apparatus of the type presented here for illustrating the formation of visible and invisible stripes in a surface containing the area-forming pixel arrangement.
Figure 4B:
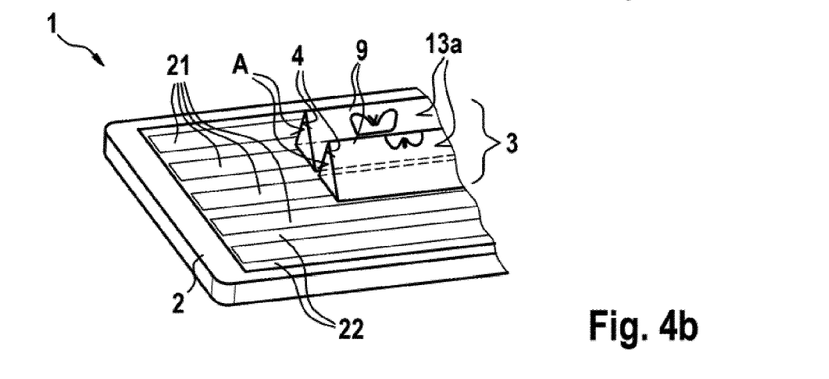

FIGS. 4a and 4b each show in a perspective view a further, highly simplified model example of a visual field display apparatus 1 of the type presented here (for example that of FIG. 1) for illustrating the formation of visible and invisible stripes in a surface containing the area-forming pixel arrangement 2. As in FIGS. 3a-3c, the area-forming pixel arrangement 2 is embodied here also as a flat-panel screen that produces a desired display content, in this example the two-dimensional image of a butterfly shown in FIG. 4a. The reflection-suppressing deflection arrangement 3 arranged on the area-forming pixel arrangement 2 is in this model example also formed, analogously to FIGS. 3b-3c by prisms 9 that lie on the flat-panel screen and adjoin one another with their long sides, of which only two of possibly more than two prisms are shown here again for the sake of simplicity.

As is made clear in FIGS. 4a and 4b by stripes with a light background on the flat-panel screen, stripes 21 that are parallel to the reflection surfaces 4 of the prisms 9 and can be made visible to the user of the visual field display apparatus 1 on account of the deflection of the projection light at the reflection surfaces 4 of for example a total of five identical prisms 9 extend in the pixel surface of the flat-panel screen. Stripes 22 that are invisible to the user of the visual field display apparatus 1 are located therebetween. The invisible stripes 22 can therefore be left black in the pixel arrangement or indeed be used for other functions, for example as an air outlet for windshield heating or other functions already mentioned for example further above. In particular, a first reflection surface 4, located the furthest from the user 6, with or without a prism or with a prism that has been cut off as described further above can be placed for example in FIG. 1 directly under a pane base of the windshield 5 of the motor vehicle for this purpose.

Figure 5A:
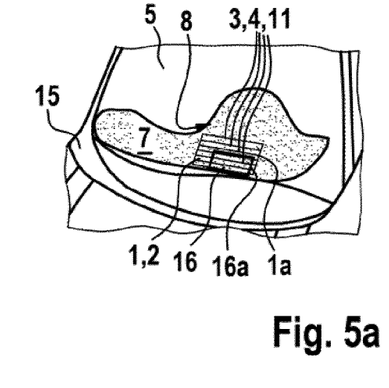
FIG. 5a shows a perspective view of a possible arrangement of a visual field display apparatus of the type presented here in an upper side of an instrument panel of a motor vehicle.

FIG. 5a shows a perspective view of a possible arrangement of a visual field display apparatus 1 of the type presented here (for example that of FIG. 1) in an upper side 7 of an instrument panel 8 of a motor vehicle 15. Owing to its flat construction described with respect to FIGS. 1 and 2a-2c, the visual field display apparatus 1 can extend along the upper side 7 of the instrument panel 8 clearly beyond the rim 16a (indicated in FIG. 5a for comparison purposes) of a light exit opening 16 of a projection unit of the conventional HUD construction described in the introductory part. As is described further above with respect to FIG. 2a, the extent of the visual field display apparatus 1 in the upper side 7 of the instrument panel 8 is in principle scalable up to the total surface of the upper side 7.

In FIG. 5a, an area-forming pixel arrangement 2 of the visual field display apparatus 1 takes up a partial surface of the upper side 7 of the instrument panel 8 of the motor vehicle 15 in front of the windshield 5, which is delimited purely by way of example by a rectangular contour 1a. The area-forming pixel arrangement 2 can be embodied in particular as one or more 2D or 3D flat-panel screens that are arranged next to one another in a planar, an interleaved, or a stepped manner. The area-forming pixel arrangement 2 is covered in the direction of the windshield 5 by a reflection-suppressing deflection arrangement 3, the plurality of mutually parallel reflection surfaces 4 of which or the light-absorbing rear sides 11 of which are indicated by parallel lines.

Figure 5B:
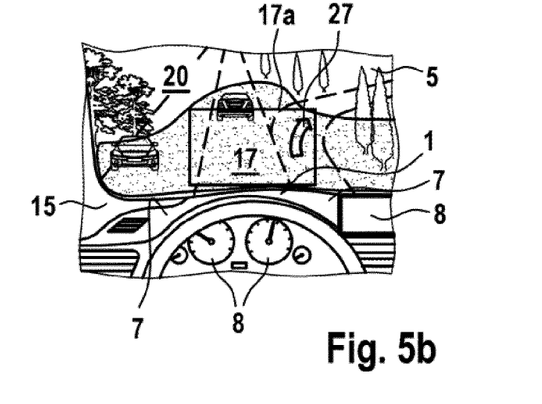
FIG. 5b shows a perspective view of a projection region, usable with the visual field display apparatus of FIG. 5a, in the windshield of the motor vehicle from the driver's view with a virtual turning arrow superposed in a contact-analog manner.

FIG. 5b shows the projection region 17, usable with the visual field display apparatus 1 of FIG. 5a, in the windshield 5, the boundary 17a of which corresponds to the contour 1a of the visual field display apparatus 1. The projection region 17 extends upwardly noticeably significantly beyond the horizon and also laterally covers a plurality of lanes of the road region in front of the motor vehicle 15 that can be viewed by the driver. Owing to the correspondingly large solid angle or field of view of the visual field display apparatus 1, it is suitable in particular for contact-analog superposition of virtual support contents into the visual field of the driver depending on the real environment 20 in front of the motor vehicle 15. In particular, a true contact-analog 3D effect (stereo augmented reality) is possible with the visual field display apparatus 1:

The area-forming pixel arrangement 2 of FIG. 5a can be embodied for this purpose in a known manner, for example according to DE 10 2009 054 232 A1, for autostereoscopic or 3D representation, by comprising for example a two-dimensional pixel matrix in the form of a liquid crystal screen with a microlens array arranged thereon. Such an area-forming pixel arrangement 2 can be controlled by an image-generating unit and/or a control unit such that two different 2D images reach the left and the right eye of the driver of the motor vehicle 15 to give the driver a spatial impression of the virtual display image represented. Using an autostereoscopic area-forming pixel arrangement 2, representations perceived as three-dimensional can be generated in this way at arbitrary distances between approximately 1 m and up to infinitely far from the eyes of the driver. In this case, in particular in principle all planes of convergence are able to be realized simultaneously, allowing immersion in a virtual 3D world.

Figure 6:
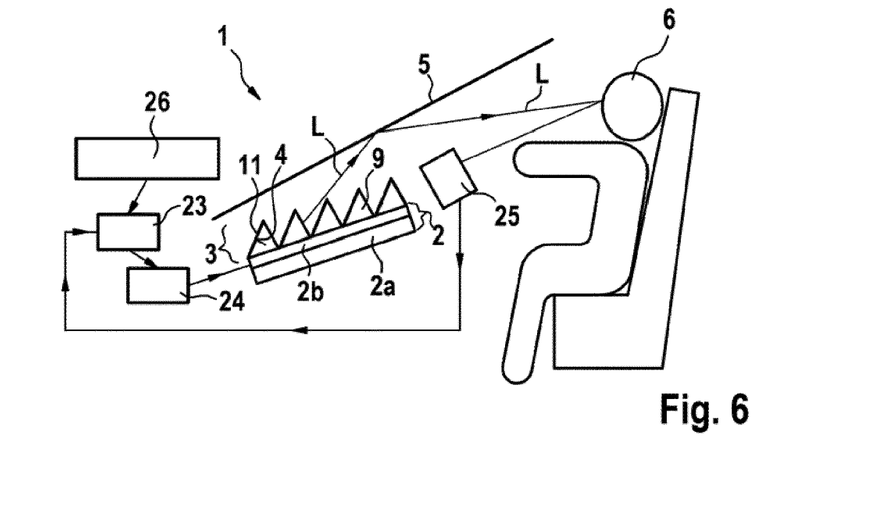
FIG. 6 shows a schematic lateral cross-sectional view of a visual field display apparatus of the type presented here with drive components for the area-forming pixel arrangement thereof for generating a real contact-analog 3D effect in the user.

FIG. 6 shows a schematic lateral cross-sectional view of a visual field display apparatus 1 according to FIG. 1 and FIG. 2a or 5a, the area-forming pixel arrangement 2 of which is embodied in the manner described above for autostereoscopic representation. For this purpose, the area-forming pixel arrangement 2 has for example a light-intense display 2a, for example a liquid crystal screen or any other standard display usable for example even in the conventional HUD, and a microlens array 2b arranged thereon or deflection means of a different type in accordance with DE 10 2009 054 232 A1, which deflect light rays of different light-emitting points of the display 2a into different emission directions.

For controlling the area-forming pixel arrangement 2 for generating a contact-analog 3D effect in the user 6, a control unit 24 for the display 2a and the microlens array 2b is further provided in a manner known per se. The control unit 24 can contain for example a display content to be represented by an image-generating unit 23 as a visual display image. In this case, the image-generating unit 23 can be embodied in particular for calculating a suitable stereoscopic representation of environment objects to be represented for the user 6 and, for this purpose, receive, for example, data relating to an environment 20, currently located ahead, of the motor vehicle 15 from an environment-capturing unit 26 and/or a current eye position of the user 6 from an eye tracking unit 25 that can comprise for example one or more cameras. The respective signal lines are indicated in FIG. 6 by way of arrows.

Figure 7:
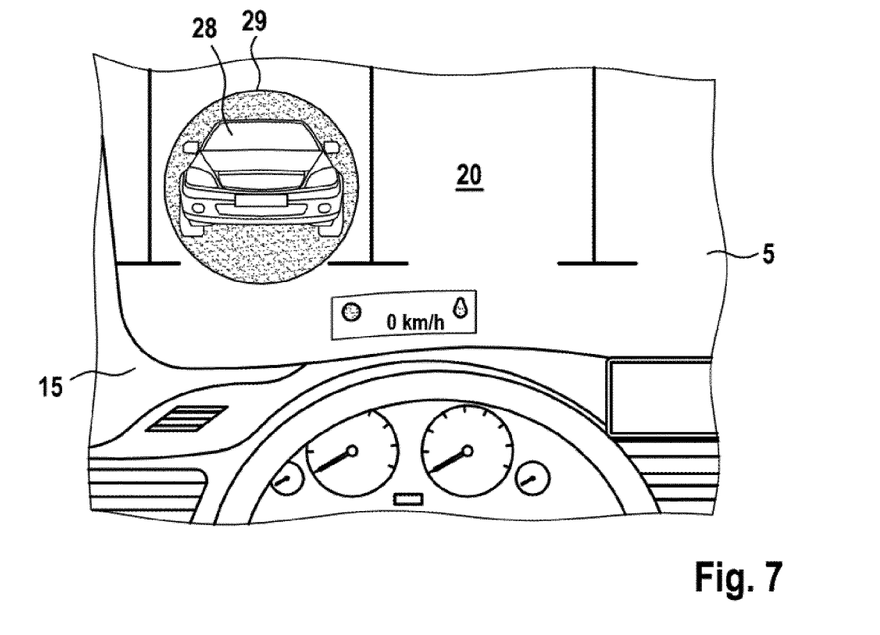
FIG. 7 shows a perspective windshield view from the driver's view with a virtual marking of another vehicle superposed in a contact-analog manner using the visual field display apparatus of FIG. 6.

With respect to FIGS. 5b, 7 and 8, examples of a method for operating a visual field display apparatus 1 in accordance with FIG. 6 will be described below. (In this case, the contents 29, 30 and 31 superposed in FIGS. 7 and 8 as virtual display images have no peripheral lines, rather the indicated peripheral lines serve only for the purpose of clarification for the reader.)

In a first variant of the method, an environment 20, currently located ahead behind the windshield 5, of the motor vehicle 15 is captured by the environment-capturing unit 26. Depending on the environment 20 that is captured, information such as virtual object images and/or object markings for supporting the user 6 in the navigation in autonomous or assisted driving or for visualizing/clarification of a driving situation captured by the motor vehicle 15 and its driving intention in highly automated or fully automated driving (HAD/FAD) is superposed in a contact-analog fashion into the visual field of the user 6, in particular of the driver of the motor vehicle 15. For example, in FIG. 5b, a virtual turning arrow 27 is superposed in a contact-analog manner into the correct turning location of the road ahead, in FIG. 7a another vehicle 28 in front of the own motor vehicle 15, which other vehicle 28 is captured in a parking lot in the dark, is virtually marked to be clearly visible with a colored, for example red, circle 29, and in FIG. 8, a correct lane in front of the own motor vehicle 15 is visualized on a road without lane markings by way of a continuous colored, for example yellow, virtual lane marking 30 in the form of the entire lane to be traveled.

Figure 8:
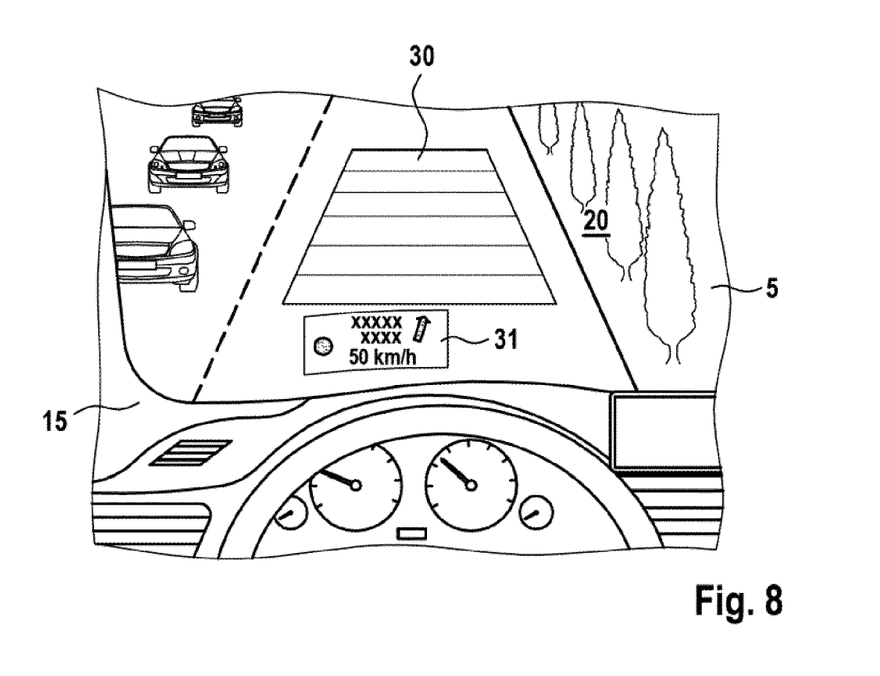
FIG. 8 shows a further perspective windshield view from the driver's view with a virtual marking, superposed in a contact-analog manner using the visual field display apparatus of FIG. 6, of a driving lane and a further virtual display content that is statically superposed by means of an additional conventional projection unit.

With reference to FIG. 8, a second variant of the method, which is able to be combined with the above-mentioned first variant, is described. Here, the visual field display apparatus 1 according to the hybrid approach mentioned further above furthermore has, in addition to the area-forming pixel arrangement 2 with the reflection-suppressing deflection arrangement 3 arranged thereon, a conventional projection unit of the type mentioned in the introductory part (not shown) for generating a further virtual display image 31 that is superposed into a visual field of a user 6. That is to say that the projection unit has, in its interior, an image-generating unit for generating a further projection light beam with the further display content 31 and a conventional projection optical unit, arranged opposite the image-generating unit, for projecting the generated further projection light beam onto a partial surface of the windshield 5.

In this case, the area-forming pixel arrangement 2 with the reflection-suppressing deflection arrangement 3 arranged thereon can be arranged in the upper side 7 of the instrument panel 8 of the motor vehicle 15 for example as indicated in FIG. 5a next to the light exit opening 16 of the projection unit, in particular directly adjoining it or around it. In particular, however, the light exit opening 16 of the projection unit—not as is shown in FIG. 5a for the conventional location thereof—can be arranged closer to the pane base of the windshield 5 and adjoining the contour side of the area-forming pixel arrangement 2 that is the lower contour side in FIG. 5a and be embodied longer than in FIG. 5a in the horizontal direction in order to be used for the display of the further virtual display image 31 deeper below the horizon, for example directly under the contact-analog virtual display image generated by the area-forming pixel arrangement 2.

The second variant of the method, illustrated in FIG. 8, for operating such a visual field display apparatus 1 (hybrid approach) in a motor vehicle 15 comprises providing system state data, in particular relating to a current operating state of an engine or an on-board energy store, and/or providing distance data for a path section lying ahead, in particular details relating to a speed limit, relating to an ascending or descending gradient, relating to one or more bends, relating to weather conditions, relating to traffic, and/or relating to vehicles driving ahead. A further virtual display image 31 is superposed statically, in particular independently of real objects behind the windshield 5, into the visual field of the user 6 of the visual field display apparatus 1 by means of the projection unit depending on the provided system state data and/or distance data. This further virtual display image 31 can comprise, in a known manner, predetermined static information, for example warnings in the case of a critical state of charge of an on-board energy store or a critical filling level of an on-board fuel tank or impending bad weather or an indication of a currently applicable speed limit or the exceedance thereof, etc., and further navigation and system notifications, as shown in FIG. 8.

Figure 9A:
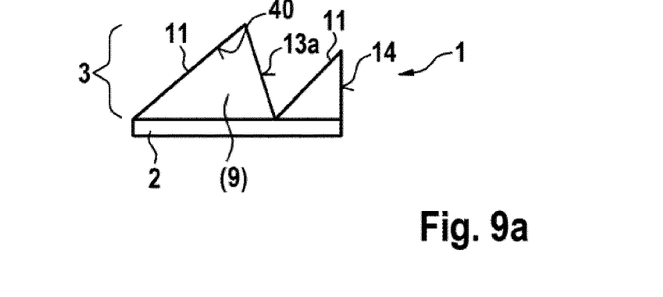
FIGS. 9a to 9c show schematic lateral cross-sectional views of further visual field display apparatuses of the type presented here.
Figure 9B:
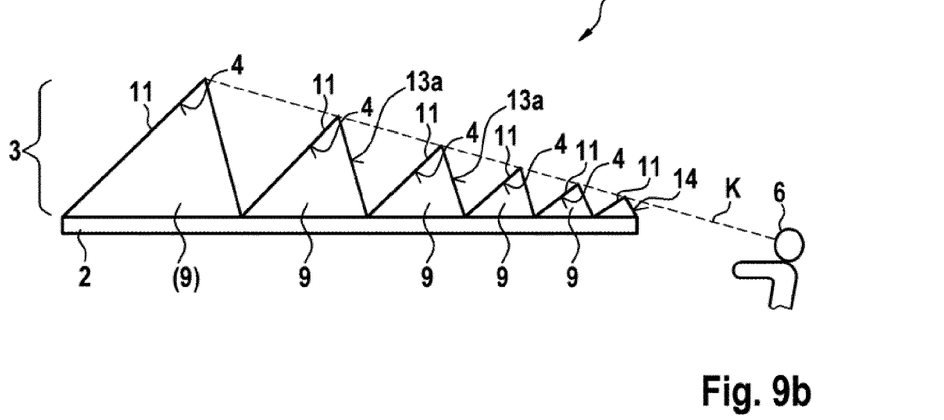
Figure 9C:
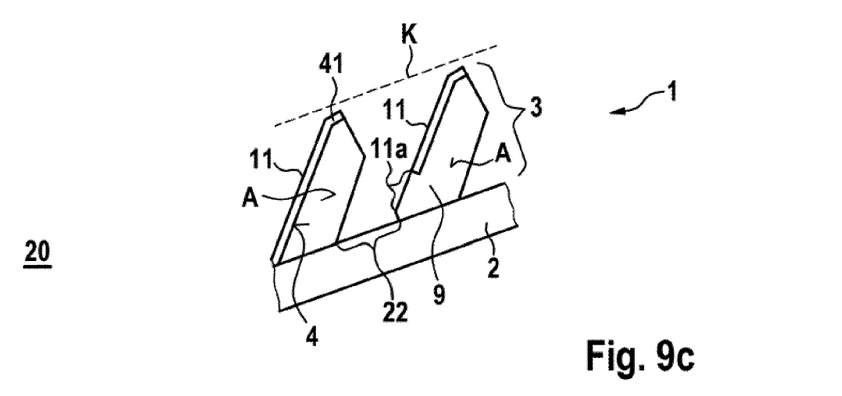

FIGS. 9a-9c each show a schematic vertical cross-sectional view of further specific configurations of the visual field display apparatus 1 of the type presented here. The reflection-suppressing deflection arrangement 3 of FIGS. 9a-9b differs from that of FIGS. 1 and 6 in that it has only one large reflection surface 40 (FIG. 9a) or a plurality of reflection surfaces 4 with varying heights perpendicular to the area-forming pixel arrangement 2 (FIG. 9b).

With the visual field display apparatus 1 shown in FIG. 9a having a single large reflection surface 40 with a height of approximately 6 cm (in the direction perpendicular to the area-forming pixel arrangement 2), it is already possible to achieve a field of view that is, in terms of vertical direction, comparable to the traditional HUD in today's motor vehicles mentioned in the introductory part. However, at the same time, the visual field display apparatus 1 of FIG. 9a can be embodied, owing to its flat construction, to be significantly wider than the conventional HUD in the horizontal direction, which can produce overall a correspondingly significantly larger field of view. It is possible here, although not absolutely necessary, that the reflection surface 40 is formed by a lateral surface side of a prism 9. Instead, the reflection surface 40 can also be simply an inclined mirror having a thickness that is necessary for the stability thereof and the protection of a user against injury, because this thickness has no influence on the generated virtual display image. The same is also true for the reflection surface 4, arranged in each case closest to the windshield 5, in FIGS. 1 and 6. Just as in FIGS. 1 and 6, a mock-up with a light-absorbing cover surface 14 facing the user 6 and a light-absorbing rear side 11 that is parallel to the reflection surface 40 is arranged opposite the reflection surface 40 for suppressing bothersome reflections in FIG. 9a.

In FIG. 9b, the same as for the reflection surface 40 in FIG. 9a can apply to the first reflection surface 4 from the left, which is arranged for example in a motor vehicle, closest to the windshield 5 thereof. Owing to further reflection surfaces 4 that are in each case successively reduced in terms of height and formed by prisms 9 of correspondingly different heights as shown in FIG. 9b, a larger field of view of the visual field display apparatus 1 is attainable as compared to FIG. 9a.

Owing to the heights of the reflection surfaces 40, 4 or the rear sides 11 thereof that are successively reduced in FIGS. 9a and 9b, the upper edges thereof can be oriented on a line K, leading to the eyes of the user 6, even in the case of a portion of the upper side 7 of the instrument panel 7 of the motor vehicle that is inclined more strongly to the windshield 5 for example in comparison to FIG. 1.

In FIG. 9c, the reflection-suppressing deflection arrangement 3 differs from that of FIGS. 1 and 6 in that prism edges that are located opposite the respective reflection surfaces 4 are cut off in a region corresponding to the aforementioned invisible stripes 22 so as to use for example the invisible stripes 22 in the surface of the area-forming pixel arrangement 2 for ventilation or other functions and/or to reduce the weight of and the material used by the reflection-suppressing deflection arrangement 3.

In addition, in FIG. 9c, the upper prism edges 10 are chamfered unlike in FIGS. 1 and 6 to prevent in particular a risk of injury of the user 6 at exposed edges. Overall, a pentagonal cross-sectional area A that is illustrated schematically by way of example in FIG. 9c is obtained for a respective prism 9 rather than a triangular cross-sectional area A of FIG. 1 or 6.

In FIG. 9c, the respective chamfered face 41 on the roof of the prism 9 can be in particular relatively wide, approximately corresponding to the illustrated scale with respect to the size of the cross-sectional area A. It can in particular likewise be embodied to be light absorbing, for example similarly to the rear sides 11 of the reflection surfaces 4. In this case, in FIG. 9c, a lower partial surface 11a, dimensioned correspondingly with respect to a complete suppression of bothersome reflections, of the respective rear side 11 of a reflection surface 4 can further be embodied—rather than for light absorption—as an ambient light diffuser, for example, if the invisible stripe 22 located in front of it is used for ambient light generation.

In the visual field display apparatuses shown in FIGS. 1 to 9c, it is possible with an area-forming pixel arrangement 2, which has a 2D screen rather than an autostereoscopic screen, to generate a virtual display image at a fixed distance of slightly under or over a meter, at typical motor vehicle dimensions approximately 1.2 m, from the user 6. No eye tracking is necessary either. In this region, it is hereby possible for example, instead of a conventional instrument cluster display, for information for example related to the vehicle state to be permanently displayed without eye tracking having to be evaluated.

LIST OF REFERENCE SIGNS

1 Visual field display apparatus
1a Contour of the visual field display apparatus in an instrument panel
2 Area-forming pixel arrangement
2a Display
2b Microlens array
3 Reflection-suppressing deflection arrangement
4, 40 Reflection surfaces of the reflection-suppressing deflection arrangement
5 Windshield
6 User of the visual field display apparatus
7 Upper side of the instrument panel
8 Instrument panel of a motor vehicle
9 Prism
10 Upper prism edge
11 Rear sides of the reflection surfaces of the deflection arrangement
12 Ambient light
13 Light exit plane(s) of the deflection arrangement
13a Light exit face of a prism
14 Cover surface
15 Motor vehicle
16 Light exit opening of a conventional HUD projection unit
16a Rim of the light exit opening
17 Projection region of the visual field display apparatus from the driver's view
17a Boundary of the projection region from the driver's view
18 Projection region of the visual field display apparatus from the front passenger's view
18a Boundary of the projection region from the front passenger's view
19 Projection region of a conventional HUD projection unit
19a Boundary of the projection region of the conventional HUD projection unit 20 Environment located ahead or behind the projection screen
21 Visible stripes
22 Non-visible stripes
23 Image-generating unit
24 Control unit
25 Eye tracking unit
26 Environment-capturing unit
27 Turning arrow superposed in contact-analog manner
28 Captured other vehicle in front of the own motor vehicle
29 Marking, superposed in contact-analog manner, of the captured other vehicle
30 Lane marking superposed in contact-analog manner
31 Further virtual display image of an additional HUD projection unit
41 Chamfered face on the roof of a prism
L Projection light beam
A Cross-sectional area of a prism
K Line from the user's view, on which lie upper edges of the plurality of reflection surfaces

What is claimed is:

1. A visual field display apparatus, comprising:
an electrically controllable area-forming pixel arrangement for generating a projection light beam with a display content;
a reflection-suppressing deflection arrangement that is arranged on the area-forming pixel arrangement and comprises one or more planar reflection surfaces, extending parallel to one another along the area-forming pixel arrangement at a predetermined acute angle thereto, for projecting the generated projection light beam onto a partially transparent reflective projection screen, as a result of which a virtual display image that is superposed into a visual field of a user is generated behind the projection screen; and
a projection unit for generating a further virtual display image superposed into a visual field of a user, the projection unit comprising in an interior thereof an image-generating unit for generating a further projection light beam with a further display content and a projection optical unit, arranged opposite the image-generating unit, for projecting the generated further projection light beam onto a partial surface of the projection screen,
wherein the one or more planar reflection surfaces are formed to be light-absorbing on rear sides thereof so as to suppress interfering reflections, and
wherein the area-forming pixel arrangement with the reflection-suppressing deflection arrangement that is arranged thereon is arranged next to a light exit opening of the projection unit.

2. The visual field display apparatus according to claim 1, wherein
the visual field display apparatus is for a motor vehicle,
the partially transparent reflective projection screen is a windshield of the motor vehicle, and
the virtual display image that is superposed into the visual field of the user is generated behind the windshield.

3. The visual field display apparatus according to claim 1, wherein
at least one of the reflection surfaces of the reflection-suppressing deflection arrangement is formed by a lateral surface side of a prism arranged on the area-forming pixel arrangement.

4. The visual field display apparatus according to claim 3, wherein
the prism has a triangular cross-sectional area.

5. The visual field display apparatus according to claim 1, wherein
a front reflection surface, which is located closest to a user, of the reflection-suppressing deflection arrangement is covered by a darkened or light-absorbing cover surface in a viewing direction of the user.

6. The visual field display apparatus according to claim 1, wherein
in each case, for two adjacent reflection surfaces, a light exit plane connecting an upper edge of one reflection surface and a lower edge of a rear side of the next reflection surface is oriented substantially perpendicular to the projection screen during operation of the visual field display apparatus.

7. The visual field display apparatus according to claim 1, wherein
upper edges of the plurality of mutually parallel reflection surfaces of the reflection-suppressing deflection arrangement lie, from a view of a user, substantially on a line, which is able to be oriented accordingly during operation.

8. The visual field display apparatus according to claim 1, wherein
the area-forming pixel arrangement comprises at least one autostereoscopic screen and/or at least one 2D screen.

9. The visual field display apparatus according to, claim 1, wherein
the area-forming pixel arrangement is arranged directly adjoining, around, and/or flush with a rim of the light exit opening of the projection unit.

10. A motor vehicle, comprising:
an upper side of an instrument panel extending between a windshield of the motor vehicle and a remainder of the instrument panel;
a visual field display apparatus according to claim 1, arranged on or in the upper side of the instrument panel, for superposing a virtual display image into a visual field of the driver and/or of further occupants, wherein the area-forming pixel arrangement or the reflection-suppressing deflection arrangement is arranged substantially flush with the upper side of the instrument panel.

11. A method for operating a visual field display apparatus having an electrically controllable area-forming pixel arrangement for generating a projection light beam with a display content; a reflection-suppressing deflection arrangement that is arranged on the area-forming pixel arrangement and includes one or more planar reflection surfaces, extending parallel to one another along the area-forming pixel arrangement at a predetermined acute angle thereto, for projecting the generated projection light beam onto a partially transparent reflective projection screen, as a result of which a virtual display image that is superposed into a visual field of a user is generated behind the projection screen, wherein the one or more planar reflection surfaces are formed to be light-absorbing on rear sides thereof so as to suppress interfering reflections, and wherein upper edges of the plurality of mutually parallel reflection surfaces of the reflection-suppressing deflection arrangement lie, from a view of a user, substantially in a line,
the method comprising the steps of:
providing a current position of a user of the visual field display apparatus; and
orienting the upper edges of the plurality of mutually parallel reflection surfaces of the reflection-suppressing deflection arrangement substantially in the line leading to eyes of the user depending on the provided current user position.

\* \* \* \* \*